March 5, 1940.    I. W. KNIGHT    2,192,748
CONTROL APPARATUS
Filed Jan. 16, 1937    2 Sheets-Sheet 1

Inventor
IRA W. KNIGHT
by Harry Dexter Peck
Attorney

March 5, 1940.    I. W. KNIGHT    2,192,748
CONTROL APPARATUS
Filed Jan. 16, 1937    2 Sheets-Sheet 2

Inventor
IRA W. KNIGHT
by Harry Dexter Pick
Attorney

Patented Mar. 5, 1940

2,192,748

UNITED STATES PATENT OFFICE 2,192,748

CONTROL APPARATUS

Ira W. Knight, Providence, R. I., assignor to General Fire Extinguisher Company, Providence, R. I., a corporation of Delaware Application January 16, 1937, Serial No. 120,957

2 Claims. (Cl. 297—1)

This invention relates to improvements in control apparatus. More especially it has to do with control apparatus responsive to changes of both the relative humidity and the dry bulb temperature of the air in a humidified enclosure.

The importance has long been recognized of maintaining constant a desired hygrometric condition of the air in an enclosure when material such as cotton, wool, silk, paper and the like is being processed. Such materials, because of well known hygroscopic properties, readily absorb moisture in amounts bearing a definite relation to the relative humidity of the air to which they are exposed, and this absorbed moisture content is known and expressed as a certain percentage of regain. The behavior of materials during processing is beneficially influenced by the maintenance of a constant proper hygrometric condition of the air to which they are exposed, resulting in a constant moisture content or regain in the materials. For any certain process in fabrication there is some certain regain figure that it is most desirable to keep constant.

Evidence seems to be accumulating, however, to indicate that a constant regain does not necessarily result from maintaining a constant relative humidity but that on the contrary as the dry bulb temperature rises or falls the relative humidity must be raised or lowered a slight extent correspondingly in order to maintain a constant regain.

It is a principal object of the invention to provide control apparatus which may be actuated both by the relative humidity and the dry bulb temperature of the air so that the resultant effect of the two will be in accordance with the regain characteristics of the material being processed. It is a further object to make the apparatus easily adjustable to accommodate itself to the various regains encountered in some one material at different times, or in different materials, or solely in response to changes of relative humidity, if the latter alone be preferred.

The best mode in which I have contemplated applying the principles of my invention is shown in the accompanying drawings, but these are to be taken as merely illustrative and it is intended that the patent shall cover by suitable expression in the appended claims whatever features of patentable novelty exist in the invention disclosed.

Figure 1:
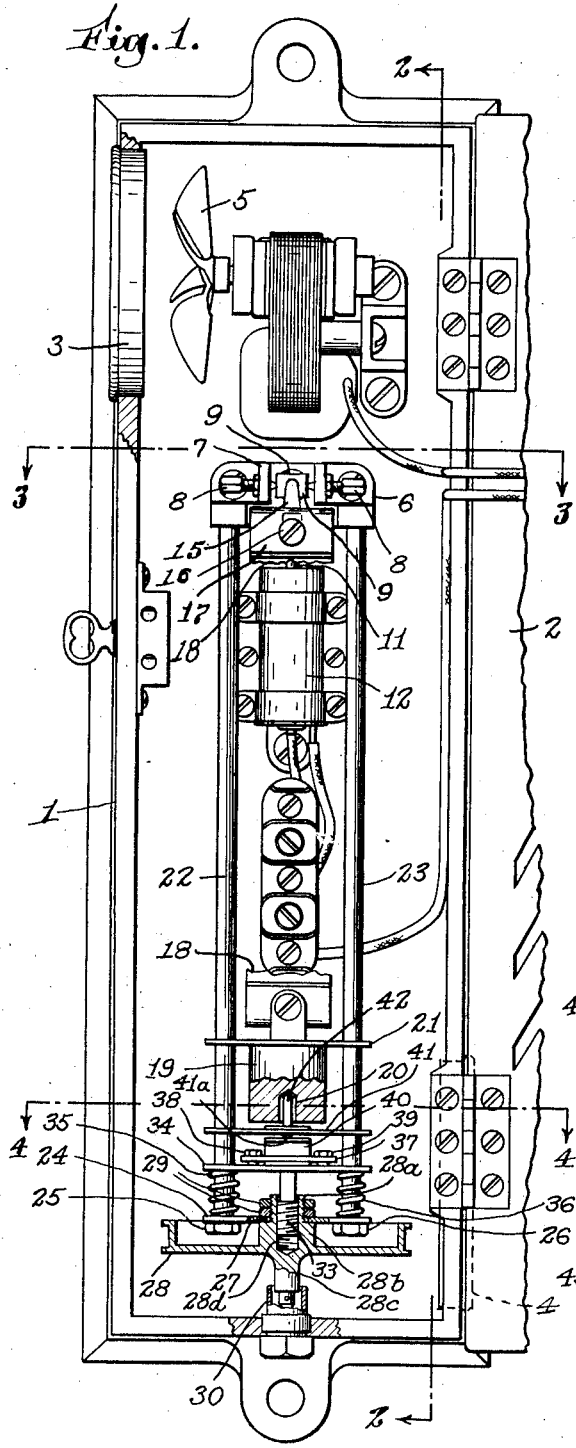
Figure 1 is a front elevation of control apparatus embodying my invention.

Referring more particularly to the drawings, the apparatus is conveniently housed in a casing 1 having a hinged cover 2 and provided with suitable openings 3, 4, through which and the space within the casing a current of air may be induced by the fan 5. Mounted on the back wall of the casing is a bracket member 6 having an outstanding portion 7 upon which are adjustably mounted axle pins 8. These pivotally support a lever 9 whose short vertically disposed arm 10 is adapted to engage the stem 11 of a switch 12 attached to the bracket 6. The horizontally disposed arm 13 of the lever extends back of the pivot pins 8 and has a weight 14 at its ends.

A vertically depending projection 15 on the lever serves to connect the lever by means of a screw 16 with the upper end 17 of a hygroscopic member 18 which is here shown as a strip of animal membrane. This is shown partly broken away in Figure 1. The lower end of this member is attached to a suitable weight 19 preferably formed as a cylindrical block with a central hole 20 extending part way through the weight from the bottom end, and with a guide plate 21 at its top which engages two rods 22 and 23 which depend from the portion 7 of the bracket 6. These rods are made of material, such as invar steel, whose response to changes in temperature is so slight as to be negligible.

Figure 2:
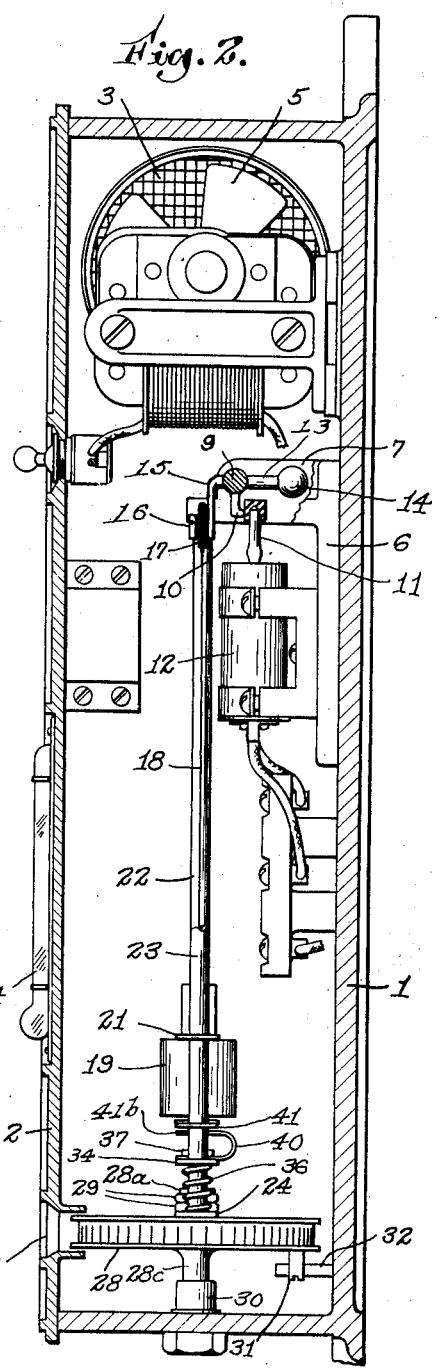
Figure 2 is a side elevation, partly in section on line 2—2 of Figure 1.
Figure 3:
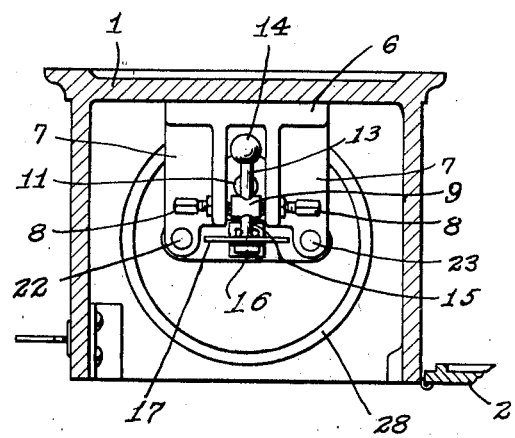
Figure 3 is a plan view on line 3—3 of Figure 1.
Figure 4:
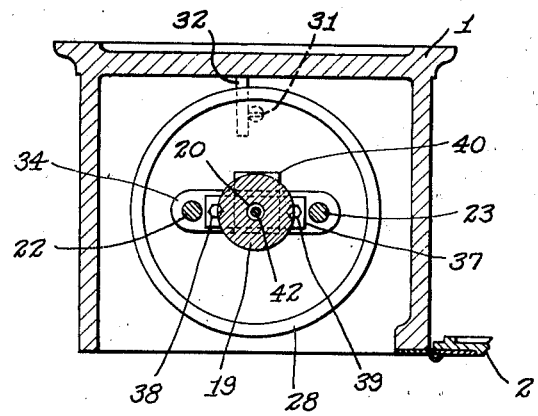
Figure 4 is a similar view on line 4—4 of Figure 1.

A plate 24 is mounted at the lower ends of these rods, being supported on the nuts 25, 26 and has a central hole 27 through which extends loosely the reduced externally threaded portion 28a of the hub 28b of an indicating disk 28. Lock nuts 29 on the threaded portion 28a mount the disk on the plate 24 in such a manner as to permit the disk to be rotated freely, but prevented from any vertical movement. The lower portion 28c of the disk hub extends within a sleeve 30 provided at the bottom of the casing 1, and has an end suitably shaped to receive a key (not shown) which may be inserted into the sleeve 30 and by which the disk may be turned. A detent pin 31 (see Fig. 2) on the disk is arranged to engage a fixed pin 32 outstanding from the back wall of the casing and thus limit the rotative movement of the disk in both directions.

The hub 28b has a threaded hole 28d therein to receive a threaded rod 33. The upper end of this rod is secured to another plate 34 which slidably engages the rods 22 and 23. To avoid any backlash between the threads on the rod 33 and the threads in hole 28d, coiled springs 35 and 36 are provided on the rods 22, 23 between the plates 24 and 34. This latter plate is provided with a clamping bar 37 and set screws 38, 39 by which a bimetallic strip 40 may be locked to the plate.

This strip is preferably of U-shape and is so arranged that its upper or free end engages a ball-shaped protuberance 41a on still another plate 41 also slidable on the rods 22 and 23. Attached to the upper side of this plate 41 is a post 42 which extends into the hole 20 of the weight block 19.

Figure 5:
Figure 5 is a perspective of a detail.

The operation of the control will first be described when it is set to respond solely to changes in relative humidity. When thus used the thermostatic element 40 is rendered inactive and the hygroscopic element is solely relied upon to effect the control. In the embodiment shown, the thermostatic strip 40 is removed and a block 51, such as is shown in Figure 5, is inserted in its place and clamped to the plate 34. This block avoids any response of the control to temperature changes, although it is obvious that the vertical position of the block may be adjusted by rotation of the disk 28, which causes the rod 33 and plate 34 to move vertically. The disk is first turned to bring the post 42 into contact with bottom of hole 20 so that the weight block is supported by the post. The weight 14 on the lever 13 counterbalances the hygroscopic element 18. Thus no pressure is exerted on the switch 12.

To adjust the control for a selected percentage of relative humidity the hygroscopic element must be placed in a location where the air is at the desired per cent and be permitted to assume its condition of length corresponding to this per cent. When thus acclimatized, as it were, the disk 28 is turned to move the post 42 downward, thus permitting the weight 19 to move downward also, pulling the element 18 along with it and swinging lever 13 counterclockwise about the axle pins 8. This will bring arm 10 into contact with the arm 11 of switch 12 and change the electrical position of the switch either making or breaking contact according to the type of switch employed. When this change occurs, the rotation of the disk 28 is stopped. The control is now set to respond at the said selected degree of relative humidity.

If the relative humidity rises the element 18 elongates and lever 13 swings clockwise under the influence of weight 14. This relieves the pressure of arm 10 on the switch stem and the latter moves to change the electrical position of the switch. Further elongation of the element merely results in further clockwise swing of the lever 13. If the relative humidity starts to fall, the element 18 shortens and pulls lever 13 counterclockwise until its arm 10 contacts the switch arm 11 and moves the latter to alter the switch. Further movement of the arm 11 can not occur and so, if the relative humidity goes still lower and thus further shortens the element 18, the contraction serves to lift weight 19 from the post 42. Thus under no conditions can the tension on the element 18 exceed the pull exerted by weight 19, and this weight is chosen as one which will not cause any harm to the element 18.

The foregoing action of the controller, solely in response to changes in relative humidity, is all that some users require but where it is desired to control in accordance with the regain characteristics of some material being processed, the control must then be set to respond to changes both of relative humidity and of the dry bulb temperature. When thus used, the block 51 is not employed but the thermostatic strip 40 is clamped to the plate 34 as previously described. To set the controller initially the instrument must be subjected to the conditions whereat the relative humidity is that desired to be maintained and the dry bulb temperature is that corresponding to said relative humidity when the desired regain is had. The instrument is then adjusted as previously described, the vertical setting of the post 42 being determined by rotation of the disk 28.

If the dry bulb temperature remains constant, the instrument will respond, as hereinbefore described, to any changes in relative humidity. But if the dry bulb temperature changes then the thermostatic element 40 will respond accordingly, its free end 41b either moving closer to or farther from the end clamped to plate 34. In either case it changes the position of post 42 and thus changes the point at which the element 18 is effective to change the position of switch 12. If the thermostatic element becomes warmer and its free end correspondingly moves downward, then post 42 is lowered and it will require a greater lengthening of the hygroscopic element 18 to effect a change in position of switch 12. That is, the switch 12 will be changed at a higher percentage of relative humidity, or actually at the percentage of relative humidity which at the increased temperature assures the desired regain in the material being processed. Conversely, if the temperature falls, the thermostatic element 40 will move upward, the post 42 will be raised and a lower percentage of relative humidity must be reached before the hygroscopic element 18 is effective to change the position of switch 12. But again, this lower degree of relative humidity will be that percentage which, at the decreased temperature, will maintain the desired regain in the material.

To accommodate the controller to the various regain requirements met in the processing of materials such as cotton, wool, silk, paper, and the like, different thermostatic elements may be used. Each element can then be so selected that the movement of its free end due to any dry bulb temperature change will so modify the controller action as to result in a sufficient change in the relative humidity of the air being maintained as to give the hygrometric conditions necessary for a constant regain in the particular material being processed. Or a single thermostatic element may be made up and by clamping it at different distances from its fixed end, any desired movement may be obtained at its free end. Once the proper setting of the thermostatic element is accomplished, the instrument can then be adjusted as described by rotation of the disk 28. The latter is preferably provided on its periphery with suitable graduations or indices, which can be seen at a glance through a window 43 in the hinged cover of the casing. This cover, in the instrument disclosed, is also provided with a thermometer 44 for ready reference.

I claim:

1. Control apparatus comprising, in combination, a control element to be actuated; a support; a lever pivotally mounted on said support arranged to actuate said control element; a hygroscopic element hanging from said lever; a weight attached to said hygroscopic element for causing rotation of said lever, when supported by the hygroscopic element, to effect actuation of the control element at a predetermined hygroscopic condition; supporting means including a movable member under said weight; manually operated means for adjusting the position of said movable member to support said weight and thereby determine the hygroscopic condition at which said control element is actuated; and thermostatic means carried by said movable member to vary the effective weight supporting position thereof to change the actuation of said control element in accordance with the temperature.

2. Control apparatus comprising, in combination, a control element to be actuated; a support; a lever pivotally mounted on said support arranged to actuate said control element; a hygroscopic element hanging from said lever and having a weight attached to its lower end and capable, when supported by the hygroscopic element, of effecting actuation of said control element; supporting means carrying a member arranged to be moved manually toward and from said weight; and a thermostatic element interposed between said member and said weight; the said member and thermostatic element being adjustable to determine the position of support of said weight and thereby the hygroscopic condition at which said weight will effect actuation of the control element and the said thermostatic element being responsive to temperature changes to vary the position of support of the weight whereby the control element is actuated at a different hygroscopic condition having relation to the temperature change.

IRA W. KNIGHT.